(12) United States Patent
Davis

(10) Patent No.: US 6,644,883 B2
(45) Date of Patent: *Nov. 11, 2003

(54) SECONDARY SEALING ELEMENT FOR A BOOT SEAL

(75) Inventor: Mark Davis, Portage, MI (US)

(73) Assignee: Dana Corporation, Toledo, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,792

(22) Filed: Sep. 15, 1999

(65) Prior Publication Data
US 2002/0141813 A1 Oct. 3, 2002

(51) Int. Cl.[7] ............................. F16C 11/00; F16D 1/12
(52) U.S. Cl. ....................... 403/122; 403/135; 403/134
(58) Field of Search ................................. 403/134, 145, 403/135, 141, 142, 122, 137; 277/634–637

(56) References Cited

U.S. PATENT DOCUMENTS

| 2,257,346 A | | 9/1941 | Paulus ......................... 403/134 |
| 2,396,151 A | * | 3/1946 | Brenner et al. ................ 403/75 |
| 2,397,464 A | * | 4/1946 | Booth ........................... 403/134 |
| 2,807,486 A | * | 9/1957 | Bixby ........................... 403/75 |
| 3,208,779 A | | 9/1965 | Sullivan, Jr. .................. 403/134 |
| 3,240,509 A | * | 3/1966 | Pierce ......................... 403/126 |
| 3,262,706 A | | 7/1966 | Hassan ......................... 403/134 |
| 3,279,834 A | * | 10/1966 | Budzynski .................... 403/51 |
| 3,292,957 A | | 12/1966 | Ulderup ....................... 403/134 |
| 3,343,855 A | * | 9/1967 | Husen .......................... 403/51 |
| 3,357,728 A | | 12/1967 | Melton et al. ................ 403/134 |
| 4,121,844 A | * | 10/1978 | Nemoto et al. .............. 277/635 |
| 4,220,418 A | * | 9/1980 | Kondo et al. ................ 277/391 |
| 4,572,693 A | * | 2/1986 | Nemoto ....................... 403/134 |
| 4,650,362 A | * | 3/1987 | Kubo ........................... 277/590 |
| 5,100,254 A | * | 3/1992 | Wasada ........................ 403/134 |
| 5,466,084 A | * | 11/1995 | Brueggen et al. ........... 277/635 |
| 5,538,275 A | * | 7/1996 | Lomnick ..................... 277/635 |
| 5,697,723 A | * | 12/1997 | Wood ........................... 403/135 |
| 6,009,610 A | * | 1/2000 | Brandolf .................... 29/402.03 |
| 6,102,604 A | * | 8/2000 | Maughan ..................... 403/134 |
| 6,264,568 B1 | * | 7/2001 | Frazer et al. ................ 464/173 |

* cited by examiner

Primary Examiner—Anthony Knight
Assistant Examiner—John B. Walsh
(74) Attorney, Agent, or Firm—Liniak, Berenato & White

(57) ABSTRACT

A pivotal ball joint assembly includes a ball joint, an input/output member, and a secondary seal element to prevent contamination of the boot seal during movement and articulation of the input/output member relative to the ball joint. The ball joint has a socket body and a ball stud pivotally mounted to the socket body. The ball stud has a shank portion which extends therefrom and is aligned along a shank axis. An elastic boot seal which extends between the ball stud and socket body is also included. The pivotal ball joint assembly also includes an input/output member affixed to the ball stud shank portion so that the socket body is able to freely rotate relative to the input/output shaft about the shank axis. The pivotal ball joint assembly is further rotatable through a limited range about a transverse axis perpendicular to the shank axis. The secondary seal element extends between the boot seal and the input/output member to guard the boot seal to shank portion interface against contamination during movement and articulation of the input/output member relative to the ball joint.

6 Claims, 4 Drawing Sheets

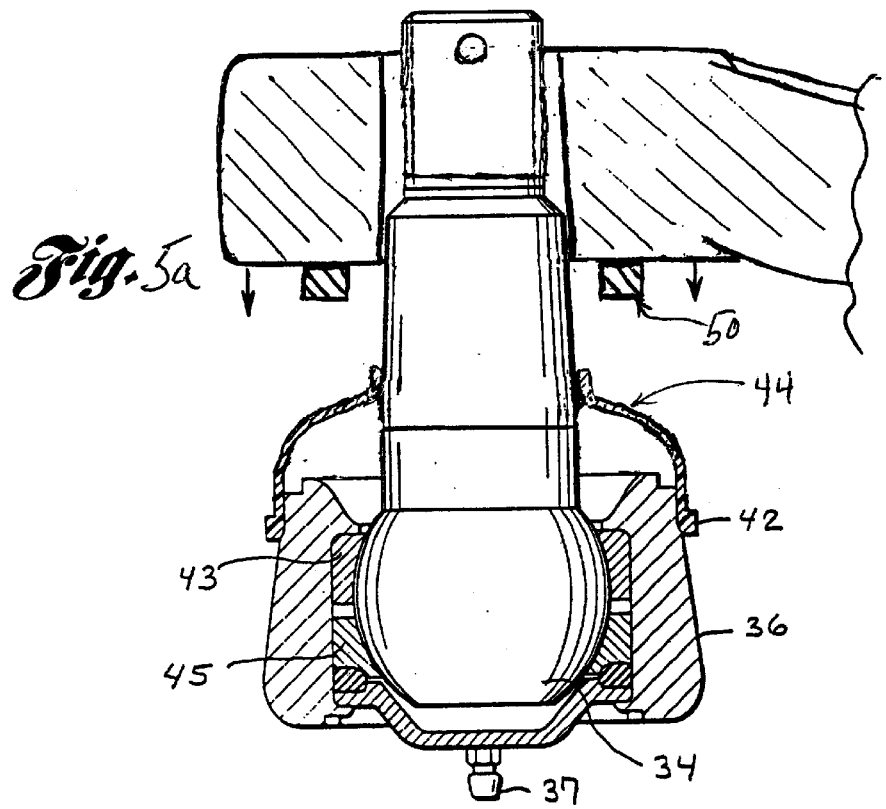
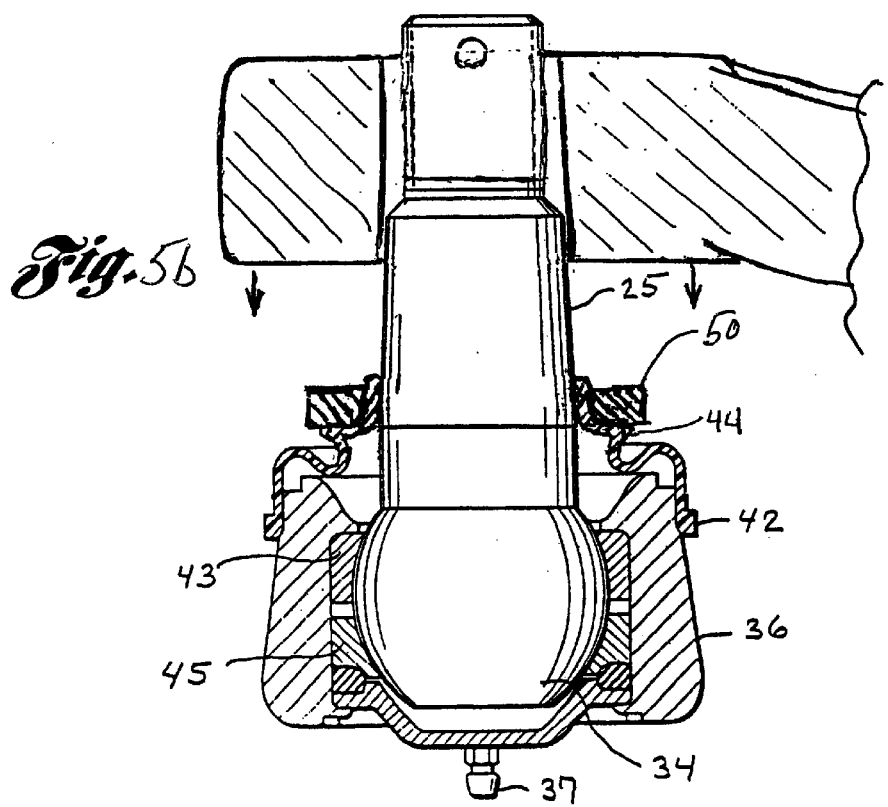

SECONDARY SEALING ELEMENT FOR A BOOT SEAL

FIELD OF THE INVENTION

The present invention pertains generally to a ball joint for motor vehicles, and more particularly to a boot seal formed of an elastically deformable material in which a secondary sealing element is provided adjacent the boot seal to shaft interface to prevent contamination of the sealed area.

BACKGROUND OF THE INVENTION

Ball joints are commonly used as a pivotal coupling for allowing two members to angularly move with respect to each other. After a period of time, the ball joint may be subject to wear as a result of contact by one or both members. This is especially true if the ball joint is surrounded by a rubber boot seal that is continually abraded by a mating member during motion, thereby resulting in the aforementioned wear and the formation of an opening in the boot. When this wear occurs in the boot seal, contamination in the form of water, dust and road salt may enter the opening causing wear to the joint connection. Moreover, the interface between the boot and the ball joint members tends to become separated from the member(s) during prolonged use, and it is common for contamination to intrude upon the sealed area after such prolonged use.

One typical use for ball joints is in a front steering assembly of a motor vehicle, and specifically in the tie rod end joint. Tie rod end joint wear is a common warranty item for front steer axle assemblies. In operation, a tie rod cross tube has a ball joint assembly mounted at each end (i.e. the tie rod end joint) to which a side tie rod arm is coupled. This ball joint permits the steering knuckle, which is connected to a tie rod arm, to articulate with respect to the tie rod cross tube.

A boot seal often surrounds the ball joint, protecting it from wear as well as sealing the ball joint connection area from environmental factors and provide a means to retain ball joint lubrication fluid. Again, the aforementioned wear is a result of abrasion by the tie rod arm of the steering knuckle against the ball joint and boot seal during articulation. Moreover, the boot tends to separate from the ball joint shaft during use, and contamination enters the sealed area as a result of such separation.

Retaining rings and protective covers have been used to prevent unwanted separation of the boot from the shaft or damage to the boot element. However, these conventional devices do not effectively protect the boot seal from damage or divert contamination away from the boot to shaft interface.

Excluding contamination from the ball joint is important to increase lubrication intervals, to eliminate the need for re-lube, to extend the serviceable life of a tie rod end joint, and to improve the performance of the joint through reduced wear. Existing tie rod assembly designs do not adequately prevent contamination at the rotating boot to arm boss interface and the boot to ball stud.

Consequently, a need has developed for a secondary sealing element for the boot seal of the tie-rod end ball joint adjacent the boot seal to arm boss interface to divert contamination from the primary boot to ball stud and arm seal location.

SUMMARY OF THE INVENTION

It is a principal object according to the present invention to provide a boot seal guard for diverting contamination from the primary boot to ball stud and arm seal location.

It is a further object according to the present invention to provide a boot seal element for use in a steering assembly of a motor vehicle for protecting the boot seal of a tie rod end ball joint from contamination during articulation of the steering knuckle.

It is still a further object according to the present invention to provide a secondary sealing element for the boot seal of the tie rod end ball joint which is both manufacturing friendly and cost effective.

And it is a still further object according to the present invention to provide a secondary sealing element which does not impede the angular movement or rotation of the ball joint.

In carrying out the above objects, features and advantages, the present invention provides a pivotal ball joint assembly which includes, generally, a secondary sealing point or points around the boot and arm boss in the form of a foam ring contacting the boot seal at locations other than the boot seal to arm boss interface. Additionally, a foamed plastic ring may be provided to contact the boot seal at one or more diameters of the boot seal. The foam seal or formed plastic ring can be fixed to the arm boss with adhesive.

The ring or formed seal provides a path for contamination to be diverted from the primary boot to ball stud and arm seal location. The formed seal provides a labyrinth that makes it difficult for contamination to reach the boot seal/ball stud interface.

In one embodiment, a foam ring is placed on the tie rod arm boss with adhesive on the boot side of the boss concentric to the tie rod hole. When the tie rod assembly is installed, the boot seals against the foam sealing ring. In another embodiment, a formed plastic ring is placed on the tie rod arm boss with adhesive on the boot side of the boss concentric to the tie rod hole. The installed tie rod assembly primary boot fits or mates with the formed plastic ring to have one or multiple sealing interfaces. The ring may be installed onto the boot seal prior to installing the tie rod on the axle and sealing the ring to the arm boss with adhesive.

The above objects and other objects, features and advantages of the present invention are readily apparent from the following detailed description of the best modes for carrying out the invention when taken in connection with the accompanying drawings wherein like reference numerals correspond to like components.

BRIEF DESCRIPTION OF THE DRAWINGS

FIGS. 5a and 5b are exploded views showing the tie rod arm seal being placed into position with the boot seal and ball joint with the secondary sealing element disposed in two different positions respectively.

DETAILED DESCRIPTION OF PREFERRED EMBODIMENT

Figure 1:
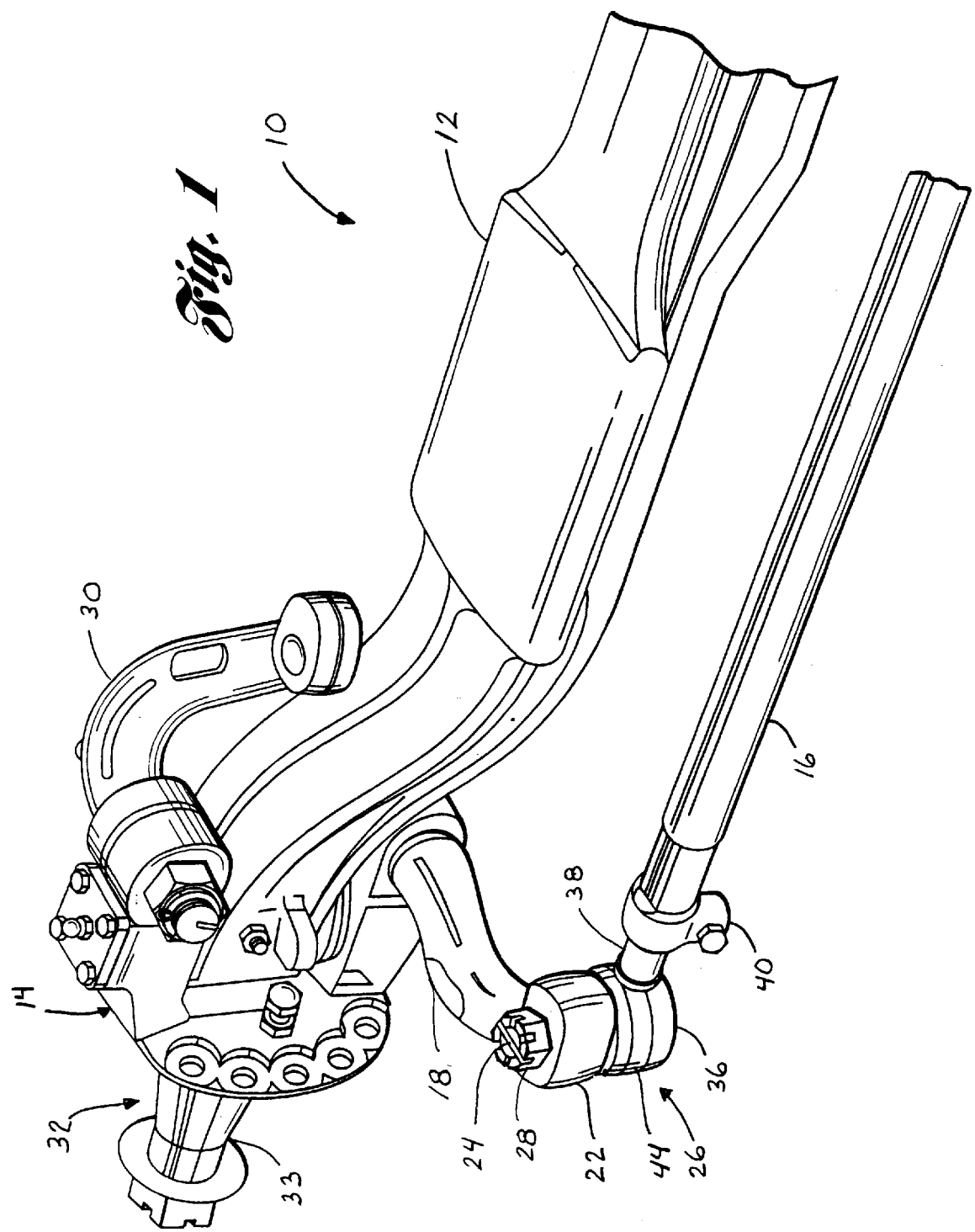
FIG. 1 is a partial perspective view of a front steering assembly, including the tie rod boot seal guard according to the present invention.

With reference to FIG. 1 of the drawings, shown is a partial perspective view of a typical front steering assembly 10 of a motor vehicle. Included in front steering assembly 10 are major components and sub-assemblies such as a steer axle beam 12, a steering knuckle 14, and a tie rod (or track rod) cross tube 16. Steer axle beam 12 is received by steering knuckle 14 and is coupled thereto. These components are also shown in FIG. 2.

Steering knuckle assembly 14 includes an input/output member 18 which is more commonly known as a tie rod arm (or Ackermann Arm). Tie rod arm 18 has a first end 20 which is coupled to steering knuckle assembly 14 and a second end 22 which is affixed to a ball stud 24 of a ball joint assembly 26, and mounted thereto by a nut 28. Of course, tie rod arm 18 may also be formed integral to steering knuckle assembly 14. More particularly, the second end 22 (boss end) of tie rod arm 18 is affixed to shank portion 25 of ball stud 24. Steering knuckle assembly 14 also includes steering arm 30 and spindle assembly 32. While the invention is shown incorporated into front steering assembly 10, it is readily contemplated that the uses of the pivotal joint assembly according to the present invention are limited only by need and imagination, and not by size, shape or complexity of design. Thus the teachings of this invention are equally suitable to any application including a ball joint assembly having a shank portion which is connected to a member moving relative thereto.

Again, for purposes of the present invention, it must be noted that tie rod arm 18 is coupled via ball joint assembly 26 to tie rod cross tube 16. Thus, ball joint assembly 26 allows steering knuckle assembly 14 to articulate and otherwise move with respect to tie rod cross tube 16. Tie rod cross tube 16 is transversely mounted and fitted at both ends with ball joint connecting sockets (discussed herein) and a socket body 36 (or socket housing) which embrace ball studs 24 retained by side tie rod arm 18 of steering knuckle assembly 14.

Figure 2:
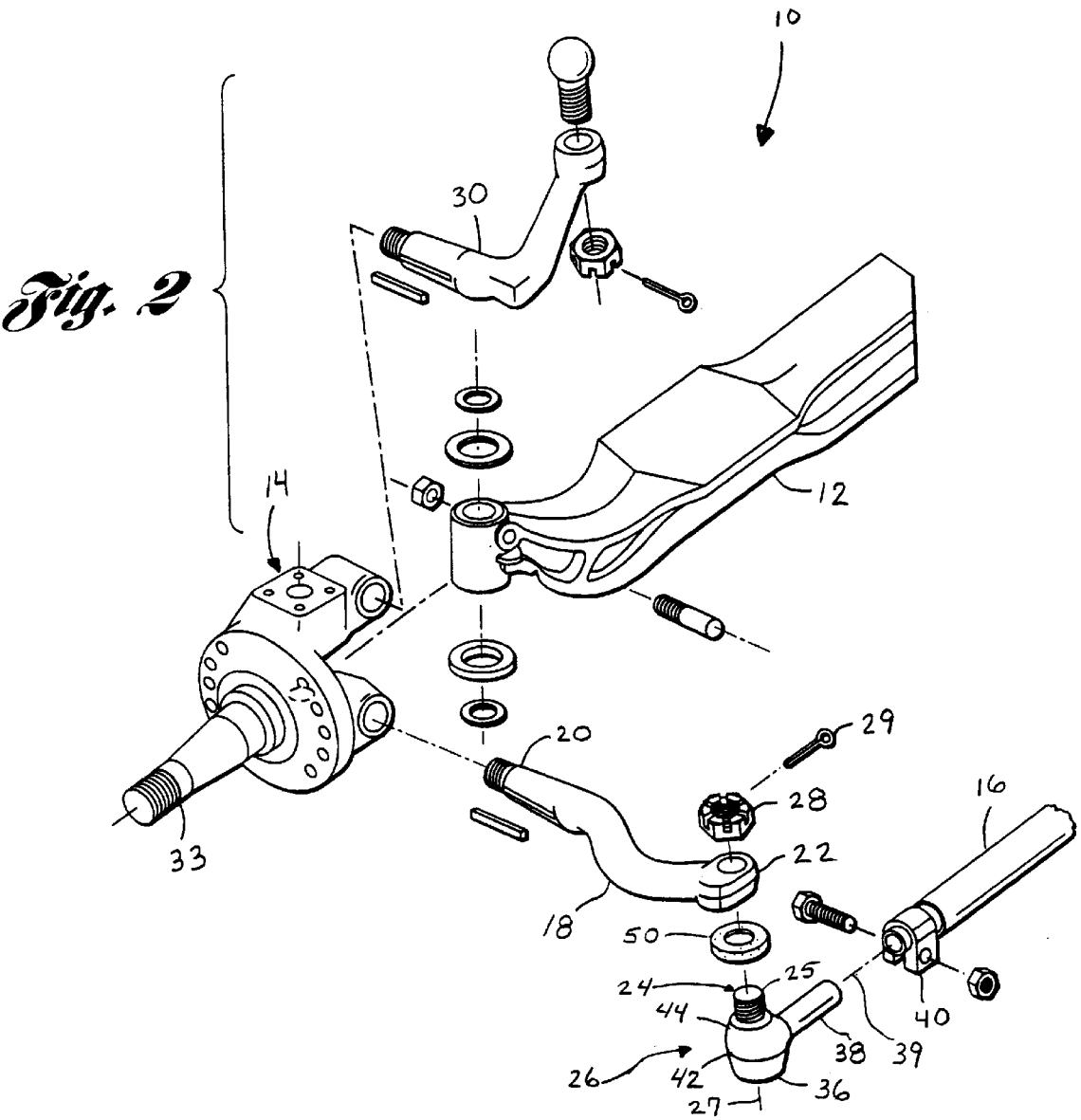
FIG. 2 is a partial perspective assembly view of a front steering assembly, including the tie rod boot seal guard according to the present invention.

Referring still to FIGS. 1 and 2, the boss end 22 of tie rod arm 18 is mounted to ball stud 24 of tie rod end ball joint assembly 26 via slotted nut 28 and cotter pin 29. Ball joint assembly 26 further includes a metal ball head portion 34 and socket 43 and 45 (best shown in FIG. 4), a socket body 36 and tie rod threaded stem 38 mounted to socket body 36. Thus, socket body 36 may freely rotate relative to input/output member 18 about shank axis 27 and further rotate through a limited range about a transverse stem axis 39 perpendicular to shank axis 27.

Figure 4:
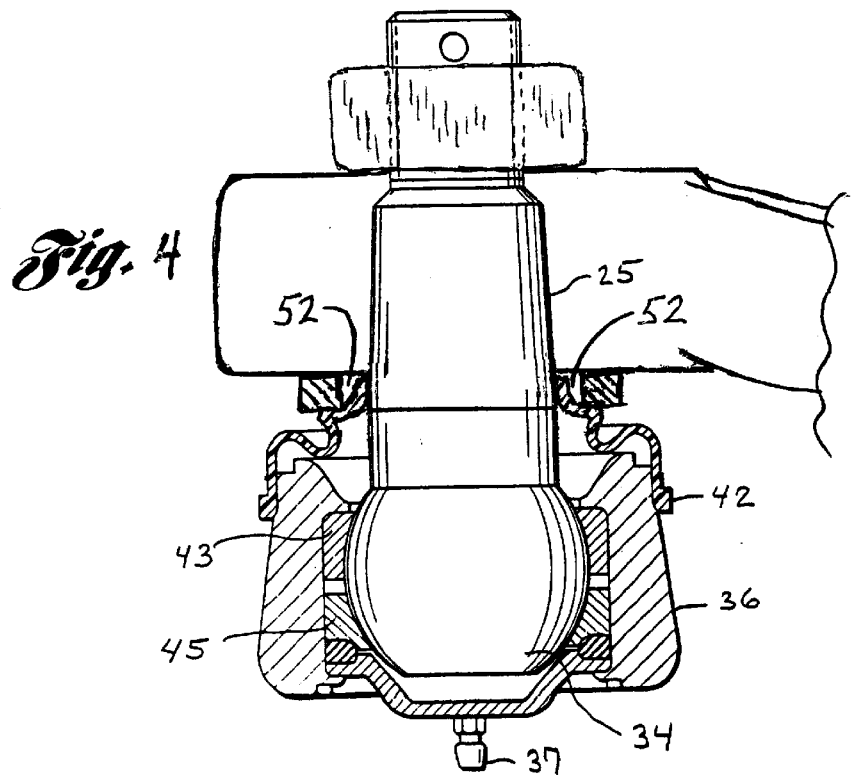
FIG. 4 is partial side sectional view of the tie rod ball joint including the tie rod boot seal guard according to the present invention.

As mentioned, tie rod threaded stem 38 includes a stem axis 39 which is perpendicular to shank axis 27 of ball stud shank 25. Further, as shown in FIG. 4 a pair of bearing seats (i.e. the socket), upper bearing seat 43 and lower bearing seat 45, are disposed in socket body 36. Upper bearing seat 43 is commonly formed of hardened steel, while lower bearing seat 45 is formed of a hard thermoplastic material which is molded around ball head portion 34. However, bearing seats 43 and 45 may both be formed either plastic or metal. It is also acknowledged that there are other methods, known in the art, of retaining ball head portion 34 within socket body 36.

Tie rod shank 38 is coupled to tie rod cross tube 16 via tie rod clamp 40 or other coupling. FIG. 2 illustrates one method of assembling front steering assembly 10 for use in a vehicle. In FIG. 2, axle beam 12 is connected at each distal end to wheel spindle assemblies 32 by means of steering knuckle assemblies 14 thereby providing pivot points for pivotably supporting spindle assemblies 32. Each wheel (not shown) is supported on a wheel spindle 33 to permit the front wheels to swing to one side or the other, around kingpin assembly 14. However, it is well known in the art that there are various methods, components, and combinations of components that may be used to connect or pivotably support the pair of transversely spaced steerable right and left wheel spindles 33 relative to steer axle beam 12. As such, this connection and support will not be discussed further herein. While it is also well-known in the art, it should be noted that the left-side front steering assembly components and sub-assemblies illustrated in the drawings herein have corresponding right-side counterparts that are oriented generally symmetrical about a center line (not shown) of steer axle beam 12 or tie rod cross tube 16.

Further shown in FIG. 2, ball joint assembly 26 further includes a boot seal 42 for protecting ball joint assembly 26 from environmental contamination wear. Such environmental contamination may result from water, dirt, gravel and other contamination which may interfere with connection between the socket and ball head portion 34. Boot seal 42 further contains a viscous oil, grease or other lubricant for lubricating ball joint assembly 26. This lubricant is pumped into boot seal 42 and socket body 36 through zerk 37 or grease fitting (best shown in FIG. 4). Specifically, boot seal 42 seals and encloses the opening where ball stud is contained within socket body 36. Boot seal 42 has an upper surface 44 having sufficient clearance so that boot seal 42 does hinder or impede the angular movement or rotation of ball stud 24. Boot seal 42 extends in an axially downward fashion between shank portion 25 and socket body 36, and is sealed against shank 25 at one end so that shank 25 projects through upper surface 44 of boot seal 42. The other end of boot seal 42 (opposite upper surface 44) is sealed against socket body 36. As socket body 36 is typically wider then shank 25, boot seal 42 is correspondingly wider at the portion proximate socket body 36, boot seal 42 being frustoconical in nature. Boot seal 42 is formed from an elastic material and preferably a rubber or urethane material having properties which are acceptable for the particular application.

Figure 3:
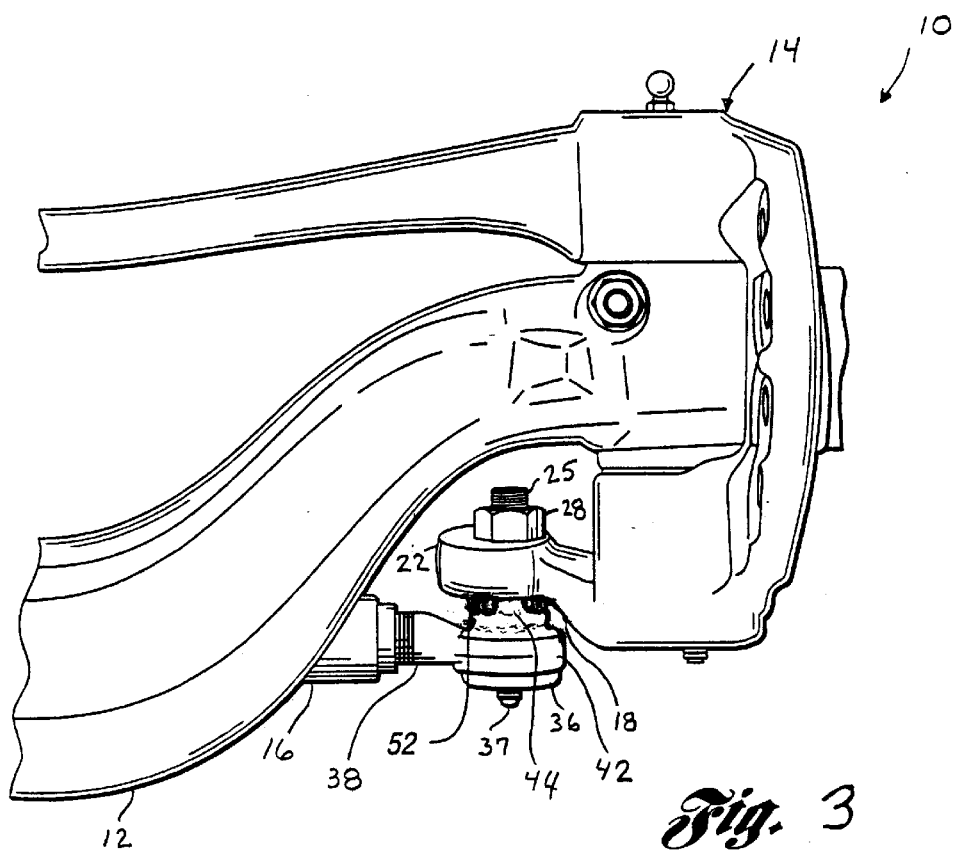
FIG. 3 is a partial front view of a front steering assembly including the tie rod boot and secondary sealing element according to the present invention.

Referring now to FIGS. 2 and 3, a secondary seal element 50 is interposed between tie rod arm end 22 and upper surface 44 of boot seal 42. Secondary boot seal element 50, according to the present invention, serves to protect boot seal 42 from contamination due to separation of the boot seal 42 from the shank 25, or to protect boot seal 42 from abrasion and rubbing as a result of tie rod arm 18 articulation with respect to ball joint assembly 26 and tie rod cross tube 16. Again, this will prevent a contamination path from being formed in boot seal 42 due to the abrasion and creates a labyrinth path for moisture and contamination from reaching the interface of the boot seal 42 and the shank 25.

FIG. 3 is a partial front view of a front steering assembly 10 including secondary seal element 50 assembled according to the present invention. Secondary sealing element 50 is preferably formed of foam, rubber, or any resilient or elastomeric material. In the preferred design shown in FIG. 4, the secondary sealing element 50 is offset from the boot seal to shank interface to simplify the assembly process while preserving the seal integrity. In this preferred design, a clearance or air pocket 52 is formed between the tie rod arm 22, the shank 25, the boot seal 42 and the secondary seal element 50. The clearance 52 enhances the flexibility of the ball joint seal arrangement. However, it is possible to provide a direct fit between the secondary sealing element 50, the boot seal 42 and the tie rod arm 22.

With focus on FIG. 4, shown therein is a partial side sectional view of a ball joint assembly 26 including the secondary seal element 50 according to the present invention. The secondary seal element 50 provides a secondary sealing point or a plurality of secondary sealing points around the boot and arm boss formed by the foam ring contacting the boot seal at locations other than the boot seal to arm boss interface. Additionally, a formed plastic ring may be provided to contact the boot seal at one or more diameters of the boot seal. The foam seal or formed plastic ring can be first fixed to the arm boss with adhesive, then assembled to the ball joint in such a manner that the element 50 contact the boot seal 42 to provide the secondary seal.

The ring or formed seal of this invention provides a path for contamination to be diverted from the primary boot to ball stud and arm seal location. In other words, the formed seal provides a labyrinth that makes it difficult for contamination to reach the boot seal/ball stud interface.

In one embodiment, a foam ring 50 is placed on the tie rod arm boss 22 with adhesive on the side of the ring that contacts the boot. The ring 50 is disposed on the boss 22 concentric to the tie rod hole 22*a*. When the tie rod assembly is installed, the boot 42 seals against the foam sealing ring 50. In another embodiment, a formed plastic ring 50 is placed on the tie rod arm boss 22 with adhesive on the boot side of the boss 22 and is disposed in a concentric manner with respect to the tie rod hole 22*a*. The installed tie rod assembly primary boot 42 fits or mates with the formed plastic ring 50 to have one or multiple sealing interfaces. Alternatively, the ring 50 may be installed onto the boot seal 42 prior to installing the tie rod 18 on the axle and sealing the ring 50 to the arm boss 22 with adhesive.

FIGS. 5*a* and 5*b* show partially exploded views of a ball joint and tie rod assembly incorporating the elements of the present invention. In FIG. 5*a*, the seal ring (secondary seal element) 50 is first affixed to the tie rod boss 22 by adhesive, then the tie rod arm is positioned onto the shank 25 of the ball joint, whereby the seal ring 50 engages a portion of the boot seal 42 intermediate of the two ends of the boot seal 42. The seal ring is preferably affixed to the boot seal 50 by adhesive. In FIG. 5*a*, the seal ring (secondary seal element) 50 is first affixed to the boot seal 42 by adhesive, then the tie rod arm is positioned onto the shank 25 of the ball joint, whereby the seal ring 50 engages the side of the tie rod boss 22*a* facing the seal ring 50. Again, the seal ring 50 is affixed to the tie rod boss 22 by adhesive.

It is understood, of course, that while the forms of the invention herein shown and described include the best mode contemplated for carrying out the present invention, they are not intended to illustrate all possible forms thereof It should also be understood that the words used are descriptive rather than limiting, and that various changes may be made without departing from the spirit or scope of the invention as claimed below. For example, the term "adhesive" has been used to describe the manner of affixing the seal ring 50 to either the boot seal 42 or the tie rod arm 18; however, any suitable affixation means may be employed to provide this sealing connection.

What is claimed is:

1. A pivotal joint assembly comprising:

a ball stud pivotally mounted to a socket body, the ball stud having a shank portion extending therefrom defining a shank axis;

an input/output member affixed to the ball stud shank portion wherein the socket body is freely rotatable relative to the input/output member about the shank axis and rotatable through a limited range about a transverse axis perpendicular to the shank axis;

a boot sleeve of resilient material surrounding said shank portion, said boot sleeve having a first end adjacent said input/output member and a second end adjacent said socket body;

a secondary sealing element formed of a flexible, resilient material extending from said input/output member to an exterior intermediate portion of said boot sleeve intermediate said first and second ends of said boot sleeve, said secondary sealing element being remote and spaced apart from said shank portion for providing protection to the boot seal during movement of the input/output member relative to the socket body, said secondary sealing element being independently bonded to adhere to one of said input/output member and said boot sleeve to thereby provide a flexible, resilient member during articulation of said input/output member relative to said socket body; and a clearance bounded by said input/output member, said boot sleeve and said secondary sealing element.

2. The pivotal joint assembly according to claim 1, wherein said secondary sealing element defines a first interface with said input/output member and a second interface with said boot sleeve.

3. The pivotal joint assembly according to claim 1, wherein said secondary sealing element circumscribes said shank portion.

4. The pivotal joint assembly according to claim 1, wherein said secondary sealing element isolates a primary interface between said boot sleeve and said shank portion from exposure to contamination.

5. The pivotal joint assembly according to claim 1, wherein said secondary sealing element is affixed to said boot sleeve about an entire circumference of said shank portion.

6. The pivotal joint assembly according to claim 1, wherein said secondary sealing element is affixed to said boot sleeve at discrete location about a circumference of said shank portion.

\* \* \* \* \*